(12) United States Patent
Yamasaki et al.

(10) Patent No.: US 11,687,705 B2
(45) Date of Patent: *Jun. 27, 2023

(54) DOCUMENT PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventors: Junya Yamasaki, Kanagawa (JP); Miho Ishizuka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,128

(22) Filed: Sep. 23, 2021

(65) Prior Publication Data

US 2022/0012415 A1 Jan. 13, 2022

Related U.S. Application Data

(63) Continuation of application No. 16/179,118, filed on Nov. 2, 2018, now Pat. No. 11,301,621.

(30) Foreign Application Priority Data

Nov. 17, 2017 (JP) ................................. 2017-222148

(51) Int. Cl.
*G06F 40/174* (2020.01)
*G06V 30/412* (2022.01)
(Continued)

(52) U.S. Cl.
CPC .......... *G06F 40/174* (2020.01); *G06V 30/412* (2022.01); *G06V 30/413* (2022.01); *G06V 30/416* (2022.01); *G06V 30/10* (2022.01)

(58) Field of Classification Search
CPC .............. G06F 40/174; G06K 9/00456; G06K 9/00469; G06K 9/00449; G06K 2209/01; G06V 30/412; G06V 30/413; G06V 30/10
See application file for complete search history.

(56) References Cited

U.S. PATENT DOCUMENTS

| 2004/0190035 A1* | 9/2004 | Ozawa | H04N 1/0035 358/401 |
| 2008/0187221 A1* | 8/2008 | Konno | G06V 10/225 382/175 |

(Continued)

FOREIGN PATENT DOCUMENTS

| JP | 2012-133569 A | 7/2012 |
| JP | 2015-022520 A | 2/2015 |
| JP | 2016-057800 A | 4/2016 |

OTHER PUBLICATIONS

Oct. 12, 2021 Office Action issued in Japanese Patent Application No. 2017-222148.

(Continued)

*Primary Examiner* — Quoc A Tran
(74) *Attorney, Agent, or Firm* — Oliff PLC

(57) ABSTRACT

A document processing apparatus includes an acquisition unit that acquires, from an electronic document, character information located in an area defined in advance based on a format of the electronic document, and a registration unit that registers the character information acquired by the acquisition unit as attribute information of the electronic document.

1 Claim, 18 Drawing Sheets

(51) Int. Cl.
  *G06V 30/413*   (2022.01)
  *G06V 30/416*   (2022.01)
  *G06V 30/10*    (2022.01)
  *G06F 17/00*    (2019.01)

(56) References Cited

U.S. PATENT DOCUMENTS

2016/0227066 A1* 8/2016 Shimazaki ........... H04N 1/4413
2018/0189562 A1* 7/2018 Yoshida ............... G06V 30/413

OTHER PUBLICATIONS

Mar. 8, 2021 Office Action Issued in U.S. Appl. No. 16/179,118.
Jun. 29, 2021, Notice of Allowance issued in U.S. Patent Applicaiton No. U.S. Appl. No. 16/179,118.

* cited by examiner

ATTRIBUTE ADDING SOFTWARE

SEPTEMBER 18, 2017

BILL

TO ABC CORPORATION

XYZ CORPORATION

| COMPONENT A | 400.00 | |
| COMPONENT B | 600.00 | |

| SUBTOTAL | 1,000.00 |
| TAX (8%) | 80.00 |
| TOTAL | $1,080.00 |

ATTRIBUTE INFORMATION | READING RANGE SETTING ~61

DOCUMENT TYPE: BILL

| ATTRIBUTE NAME | START POINT X (COORDINATE) | START POINT Y (COORDINATE) | END POINT X (COORDINATE) | END POINT Y (COORDINATE) |
|---|---|---|---|---|
| DATE COORDINATES | | | | |
| AMOUNT COORDINATES | | | | |
| CUSTOMER NAME COORDINATES | | | | |

● READ SIMULTANEOUSLY WITH PREVIEW DISPLAY
○ DO NOT READ SIMULTANEOUSLY WITH PREVIEW DISPLAY ( REGISTER )   ( CANCEL )

| ATTRIBUTE ADDING SOFTWARE | | | □ ▣ ✕ |

*Left panel (preview):*

TO ABC CORPORATION — 64

SEPTEMBER 18, 2017 — 62

DATE

XYZ CORPORATION

BILL

| | |
|---|---|
| COMPONENT A | 400.00 |
| COMPONENT B | 600.00 |

| | |
|---|---|
| SUBTOTAL | 1,000.00 |
| TAX (8%) | 80.00 |
| TOTAL | $1,080.00 — 65 |

*Right panel:*

| ATTRIBUTE INFORMATION | READING RANGE SETTING — 61 |

DOCUMENT TYPE: BILL

| ATTRIBUTE NAME | | START POINT X (COORDINATE) | START POINT Y (COORDINATE) | END POINT X (COORDINATE) | END POINT Y (COORDINATE) |
|---|---|---|---|---|---|
| DATE | [COORDINATES] | 154.3 | 21.5 | 195.3 | 35.8 |
| AMOUNT | [COORDINATES] | 160.1 | 245.3 | 195.3 | 258.6 |
| CUSTOMER NAME | [COORDINATES] | 31.0 | 45.5 | 74.9 | 62.5 |

● READ SIMULTANEOUSLY WITH PREVIEW DISPLAY
○ DO NOT READ SIMULTANEOUSLY WITH PREVIEW DISPLAY

[REGISTER]  [CANCEL]

FIG. 11

| ATTRIBUTE NAME | HORIZONTAL POSITION (mm) | VERTICAL POSITION (mm) | WIDTH (mm) | HEIGHT (mm) |
|---|---|---|---|---|
| DATE | 154.3 | 21.5 | 41.0 | 14.3 |
| AMOUNT | 160.1 | 246.3 | 35.3 | 12.7 |
| CUSTOMER NAME | 31.0 | 45.5 | 43.9 | 17.0 |

FIG. 12

| ATTRIBUTE NAME | START POINT (X COORDINATE) | START POINT (Y COORDINATE) | END POINT (X COORDINATE) | END POINT (Y COORDINATE) | CHARACTER TYPE |
|---|---|---|---|---|---|
| DATE | 154.3 | 21.5 | 195.3 | 35.8 | ALPHABETS/NUMERALS |
| AMOUNT | 160.1 | 246.3 | 195.3 | 258.6 | NUMERALS |
| CUSTOMER NAME | 31.0 | 45.5 | 74.9 | 62.5 | ALPHABETS |

HORIZONTAL CHARACTER STRING

VERTICAL CHARACTER STRING

DOUBLE-ROW CHARACTER STRINGS

FIG. 14

| ATTRIBUTE NAME | START POINT (X COORDINATE) | START POINT (Y COORDINATE) | END POINT (X COORDINATE) | END POINT (Y COORDINATE) | CHARACTER DIRECTION | NUMBER OF CHARACTER ROWS |
|---|---|---|---|---|---|---|
| DATE | 154.3 | 21.5 | 195.3 | 35.8 | HORIZONTAL | 1 |
| AMOUNT | 180.1 | 245.3 | 195.3 | 259.6 | HORIZONTAL | 1 |
| CUSTOMER NAME | 31.0 | 45.5 | 74.9 | 62.5 | VERTICAL | 2 |

FIG. 17

ATTRIBUTE ADDING SOFTWARE

TO: DEF CORPORATION

BILL

XYZ CORPORATION

OCTOBER 10, 2017

| | |
|---|---|
| COMPONENT A | 400.00 |
| COMPONENT B | 500.00 |

| | |
|---|---|
| SUBTOTAL | 900.00 |
| TAX (8%) | 72.00 |
| TOTAL | $972.00 |

DATE

ATTRIBUTE INFORMATION / READING RANGE SETTING

DOCUMENT TYPE: BILL

| ATTRIBUTE NAME | TYPE | ENTRY FIELD |
|---|---|---|
| DATE | TEXT | 10/10/2017 |
| AMOUNT | VALUE | $972.00 |
| CUSTOMER NAME | TEXT | DEF CORPORATION |

IMAGE INFORMATION

RESOLUTION: 600 dpi
SIZE: 216 × 279 mm
COLOR: MONOCHROME

USER INFORMATION

USER NAME: ABCD

REGISTRATION INFORMATION

FOLDER NAME: BILL
FILE NAME: DOCUMENT 2

REGISTER    SKIP    TEMPORARY SAVE    END

FIG. 18A

| ATTRIBUTE NAME | TYPE | ENTRY FIELD |
|---|---|---|
| CUSTOMER NAME | TEXT | DEF CORPORATION |

TO DEF CORPORATION

FIG. 18B

| ATTRIBUTE NAME | TYPE | ENTRY FIELD |
|---|---|---|
| CUSTOMER NAME | TEXT | READING ERROR (RED) |

TO DEF CORPORATION (RED)

FIG. 18C

| ATTRIBUTE NAME | TYPE | ENTRY FIELD |
|---|---|---|
| CUSTOMER NAME | TEXT | READING ERROR (RED) |

TO DEF CORPORATION (RED)

FIG. 19

ATTRIBUTE ADDING SOFTWARE

TO: DEF CORPORATION

"CUSTOMER NAME" CANNOT BE READ PROPERLY!
PLEASE SET THE READING RANGE AGAIN

| | |
|---|---|
| COMPONENT A | 400.00 |
| COMPONENT B | 500.00 |

| | |
|---|---|
| SUBTOTAL | 900.00 |
| TAX (8%) | 72.00 |
| TOTAL | $972.00 |

DATE: OCTOBER 10, 2017

ATTRIBUTE INFORMATION / READING RANGE SETTING

DOCUMENT TYPE: BILL

| ATTRIBUTE NAME | TYPE | ENTRY FIELD |
|---|---|---|
| DATE | TEXT | 10/10/2017 |
| AMOUNT | VALUE | $972.00 |
| CUSTOMER NAME | TEXT | READING ERROR |

IMAGE INFORMATION
- RESOLUTION: 600 dpi
- SIZE: 216 × 279 mm
- COLOR: MONOCHROME

USER INFORMATION
- USER NAME: ABCD

REGISTRATION INFORMATION
- FOLDER NAME: BILL
- FILE NAME: DOCUMENT 2

[REGISTER] [SKIP] [TEMPORARY SAVE] [END]

DOCUMENT PROCESSING APPARATUS AND NON-TRANSITORY COMPUTER READABLE MEDIUM STORING PROGRAM

CROSS-REFERENCE TO RELATED APPLICATIONS

This application is a continuation of U.S. application Ser. No. 16/179,118 filed on Nov. 2, 2018 which is based on and claims priority under 35 USC 119 from Japanese Patent Application No. 2017-222148 filed Nov. 17, 2017. The contents of the above applications are incorporated herein by reference.

BACKGROUND

Technical Field

The present invention relates to a document processing apparatus and a non-transitory computer readable medium storing a program.

Summary

According to an aspect of the invention, there is provided a document processing apparatus including an acquisition unit that acquires, from an electronic document, character information located in an area defined in advance based on a format of the electronic document, and a registration unit that registers the character information acquired by the acquisition unit as attribute information of the electronic document.

BRIEF DESCRIPTION OF THE DRAWINGS

An exemplary embodiment of the present invention will be described in detail based on the following figures, wherein:

FIG. 6 illustrates an example of a display screen on which an electronic document is displayed by attribute adding software;

FIG. 7 illustrates an example of a reading range setting screen displayed when a user selects a tab in order to set an OCR reading range;

FIG. 8 illustrates a case in which the user selects an area of a preview that includes date information;

FIG. 9 illustrates an example of a display screen when the user operates a coordinate button corresponding to a "date" field of attribute information while selecting the area including the date information;

FIG. 10 illustrates an example of a screen after the user has selected OCR reading ranges of "date", "amount", and "customer name";

FIG. 11 illustrates an example of a setting file for reading ranges in which the OCR reading ranges are set based on a different type of coordinate information;

FIG. 12 illustrates an example of a setting file for reading ranges in which characteristic information is set together with the coordinate information of the reading range;

FIG. 14 illustrates an example of a case in which not only information on a character type but also information on a character direction and the number of character rows is set as the characteristic information related to characteristics of character information;

FIG. 17 illustrates an example of a display screen when an electronic document of a certain bill is displayed by the attribute adding software;

FIGS. 18A to 18C illustrate examples of a case in which the OCR processing is not properly performed in a preset OCR reading range; and FIG. 19 illustrates an example of a display screen for notifying the user that a reading error has occurred.

DETAILED DESCRIPTION

An exemplary embodiment of the present invention is described in detail with reference to the drawings.

Figure 1:
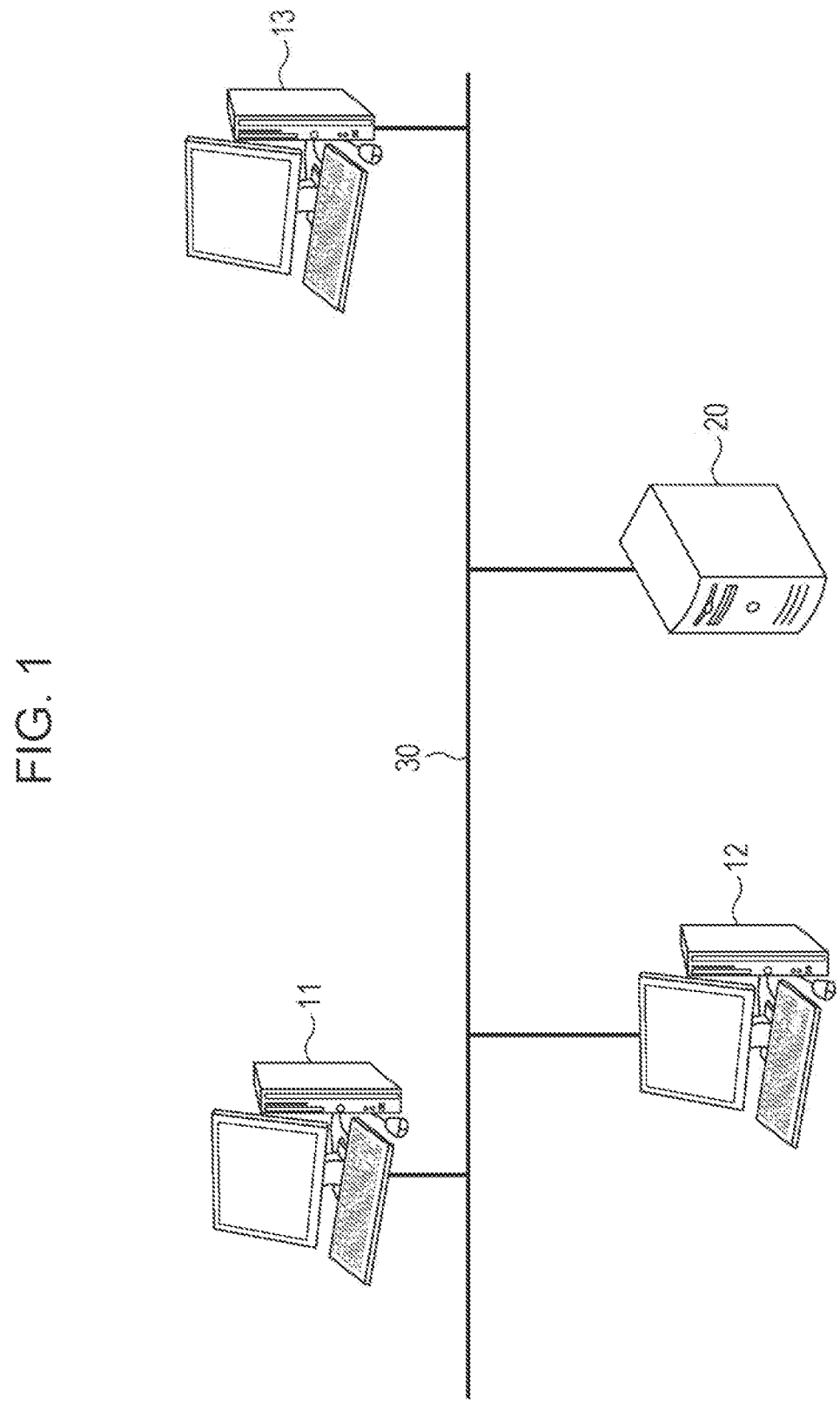
FIG. 1 illustrates the system configuration of a document management system of one exemplary embodiment of the present invention.

FIG. 1 illustrates the system configuration of a document management system of one exemplary embodiment of the present invention.

As illustrated in FIG. 1, the document management system of the exemplary embodiment of the present invention is configured by document processing apparatuses 11 to 13 such as personal computers and a server apparatus 20 that are connected to each other via a network 30.

Document management software is installed in each of the document processing apparatuses 11 to 13. With the document management software, an electronic document file (hereinafter referred to simply as an electronic document) may be edited or created.

The same document management software is installed in each of the document processing apparatuses 11 to 13. Thus, generated electronic documents may be transmitted, received, viewed, or revised.

The server apparatus 20 is connected to each of the document processing apparatuses 11 to 13 via the network 30 and is capable of storing data generated by each of the document processing apparatuses 11 to 13. Each of the document processing apparatuses 11 to 13 is capable of reading the data stored in the server apparatus 20. Thus, the document processing apparatuses 11 to 13 may exchange the electronic documents via the server apparatus 20.

The document management software described above includes attribute adding software for adding attribute information to an electronic document. The attribute adding software has a function of adding various types of attribute information such as a document type to an electronic document and storing the electronic document having the attribute information added thereto while categorizing the electronic document based on the added attribute information.

The attribute adding software has an OCR function for converting a character image into character information represented by character codes. When character information is acquired from an electronic document obtained by scanning a paper document, OCR processing is performed on a character image in the electronic document to convert the character image into character information. The character information may be registered as attribute information.

When attribute information is added to plural electronic documents, the OCR processing may be executed by specifying areas for each electronic document and obtained character information may be registered as attribute information. When this processing is repeated, the operation is cumbersome for a user.

Documents such as a bill or a receipt are often created in predetermined formats and information such as a customer name or an amount is often included in a specific area in the electronic document.

Therefore, when character information to be registered as attribute information is acquired through the OCR processing from an electronic document generated based on a specific format, each of the document processing apparatuses 11 to 13 of this exemplary embodiment performs the OCR processing on an area defined in advance based on the format to acquire the character information located in that area and registers the acquired character information as the attribute information of the electronic document.

Figure 2:
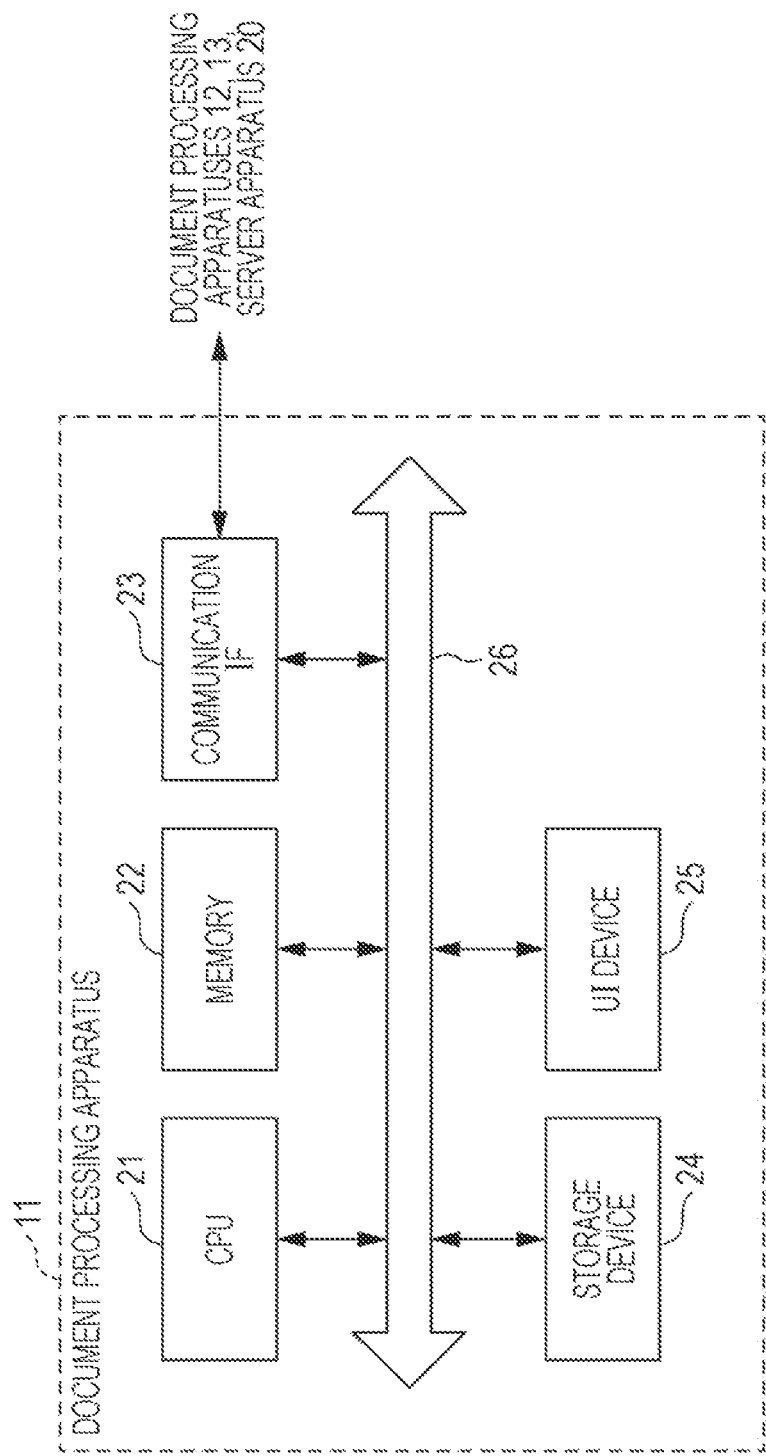
FIG. 2 is a block diagram illustrating the hardware configuration of a document processing apparatus in the exemplary embodiment of the present invention.

FIG. 2 illustrates the hardware configuration of the document processing apparatus 11 in the document management system of this exemplary embodiment. The configurations of the document processing apparatuses 12 and 13 are identical to the configuration of the document processing apparatus 11 and description thereof is therefore omitted.

As illustrated in FIG. 2, the document processing apparatus 11 includes a CPU 21, a memory 22, a communication interface (IF) 23 that transmits and receives data to and from external apparatuses and the like via the network 30, a storage device 24 such as a hard disk drive (HDD), and a user interface (UI) device 25 including a touch panel or a liquid crystal display and a keyboard. Those components are connected to each other via a control bus 26.

The CPU 21 controls an operation of the document processing apparatus 11 by executing predetermined processing based on a control program stored in the memory 22 or the storage device 24. This exemplary embodiment is described under the assumption that the CPU 21 reads and executes the control program stored in the memory 22 or the storage device 24. The program may be provided to the CPU 21 by being stored in a storage medium such as a CD-ROM.

Figure 3:
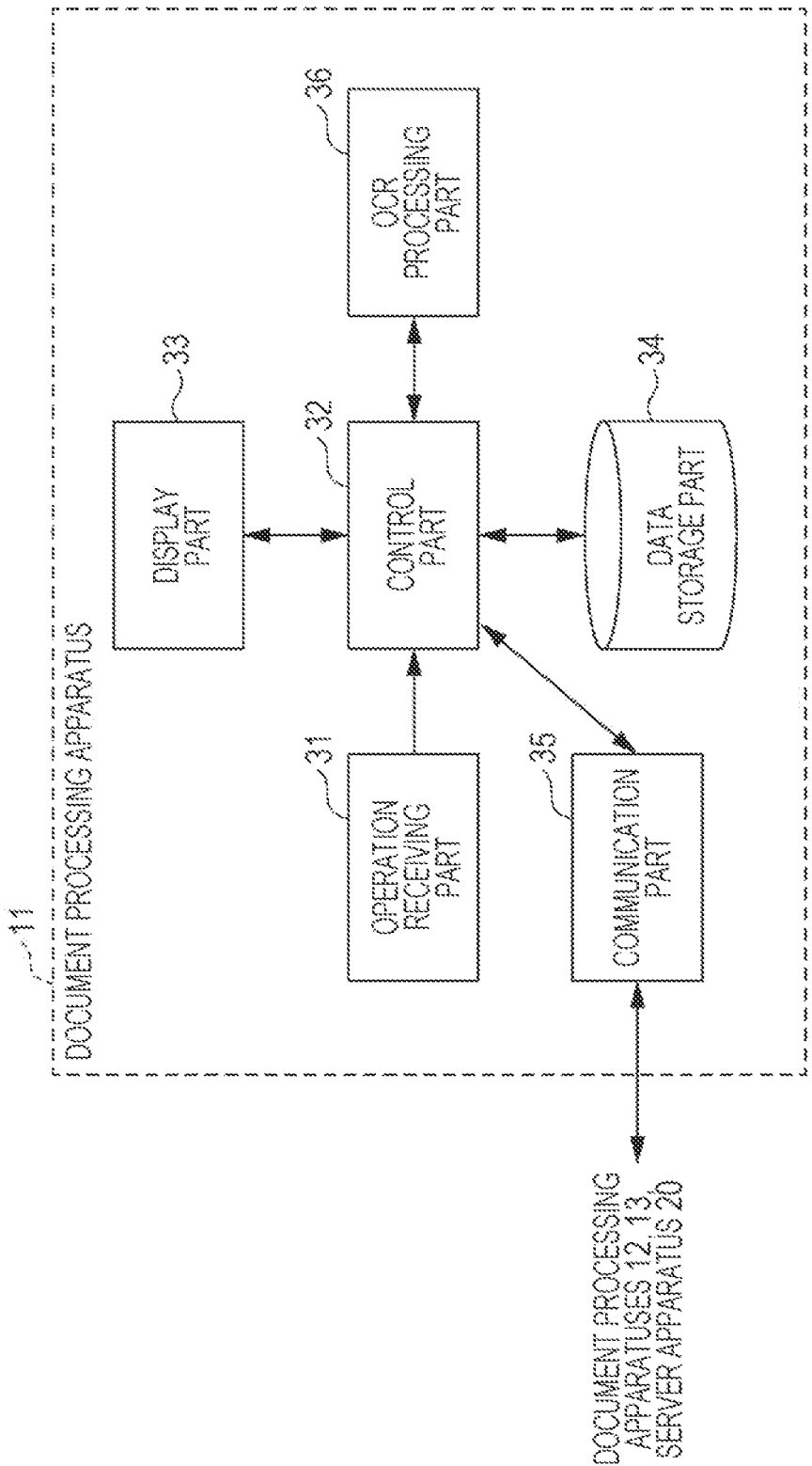
FIG. 3 is a block diagram illustrating the functional configuration of the document processing apparatus in the exemplary embodiment of the present invention.

FIG. 3 is a block diagram illustrating the functional configuration of the document processing apparatus 11 that is implemented by executing the control program described above.

As illustrated in FIG. 3, the document processing apparatus 11 includes an operation receiving part 31, a control part 32, a display part 33, a data storage part 34, a communication part 35, and an OCR processing part 36.

The operation receiving part 31 receives a setting of a position of an area where character information to be registered as attribute information is acquired from an electronic document.

The OCR processing part 36 performs the OCR processing on an area defined in advance based on a format of an electronic document such as a bill or a receipt, thereby acquiring, from the electronic document, character information located in the area defined in advance based on the format of the electronic document.

The control part 32 registers the character information acquired by the OCR processing part 36 as attribute information of the electronic document.

The display part 33 displays an electronic document and various types of information for the user based on control of the control part 32. The communication part 35 transmits and receives data to and from the document processing apparatuses 12 and 13, the server apparatus 20, and the like via the network 30.

The data storage part 34 stores, as coordinate information, the position of the area whose setting is received by the operation receiving part 31. The data storage part 34 stores, for each type of the attribute information, coordinate information of the area where character information is acquired. For example, when items such as a date, an amount, and a customer name are provided as the types of the attribute information, the data storage part 34 stores coordinate information of the area where character information is acquired for each attribute type.

The data storage part 34 stores characteristic information related to characteristics of the attribute information to be acquired. Specifically, the data storage part 34 stores, as the characteristic information, information on a character type of the attribute information to be acquired, such as information on which of alphabets and numerals are used.

The data storage part 34 may store, as the characteristic information, information on a character direction or the number of character rows of the character information to be acquired for each piece of attribute information. Specifically, the data storage part 34 may store, as the characteristic information, information on whether the character information to be acquired is arranged vertically or horizontally or whether the character information is double-row character strings.

The OCR processing part 36 acquires, from an electronic document, character information located in an area indicated by the coordinate information stored in the data storage part 34. Further, the OCR processing part 36 acquires, from the electronic document, the character information located in the area indicated by the coordinate information stored in the data storage part 34 for each type of the attribute information. When the characteristic information described above is stored in the data storage part 34, the OCR processing part 36 acquires, from the electronic document, character information located in an area defined in advance based on a format of the electronic document by using the characteristic information stored in the data storage part 34.

Specifically, the OCR processing part 36 executes the OCR processing (character recognition processing) by using the information on whether the character information to be acquired is alphabets or numerals, whether the character information is arranged vertically or horizontally, or whether the character information is arranged in plural rows.

When the character information acquired by the OCR processing part 36 from the area defined in advance contradicts the characteristic information stored in the data storage part 34, the control part 32 notifies the user that the acquired character information is not registrable as the attribute information.

For example, when the characteristic information stored in the data storage part 34 includes information related to a character type and when the character type of the character information acquired by the OCR processing part 36 from the area defined in advance is not identical to the character type included in the characteristic information stored in the data storage part 34, the control part 32 notifies the user that the acquired character information is not registrable as the attribute information.

When the OCR processing part 36 fails to acquire the character information from the area defined in advance, the control part 32 notifies the user that the attribute information is not registrable.

When the attribute information is not properly registered due to the failure in acquisition of the attribute information or the contradiction between the acquired attribute information and the characteristic information, the operation receiving part 31 receives again the setting of the position of the area where the information to be registered as the attribute information is acquired.

The control part 32 is capable of setting in advance whether to automatically register the character information acquired by the OCR processing part 36 as the attribute information of the electronic document.

When the setting is made such that the acquired character information is automatically registered as the attribute information and when the electronic document is displayed on the display part 33, the control part 32 automatically registers the character information acquired by the OCR processing part 36 as the attribute information of the electronic document.

Next, an operation to be performed by the document processing apparatus 11 of this exemplary embodiment when a character string is acquired from an electronic document displayed by the document management software and is registered as attribute information by the attribute adding software is described in detail with reference to the drawings.

Figure 4:
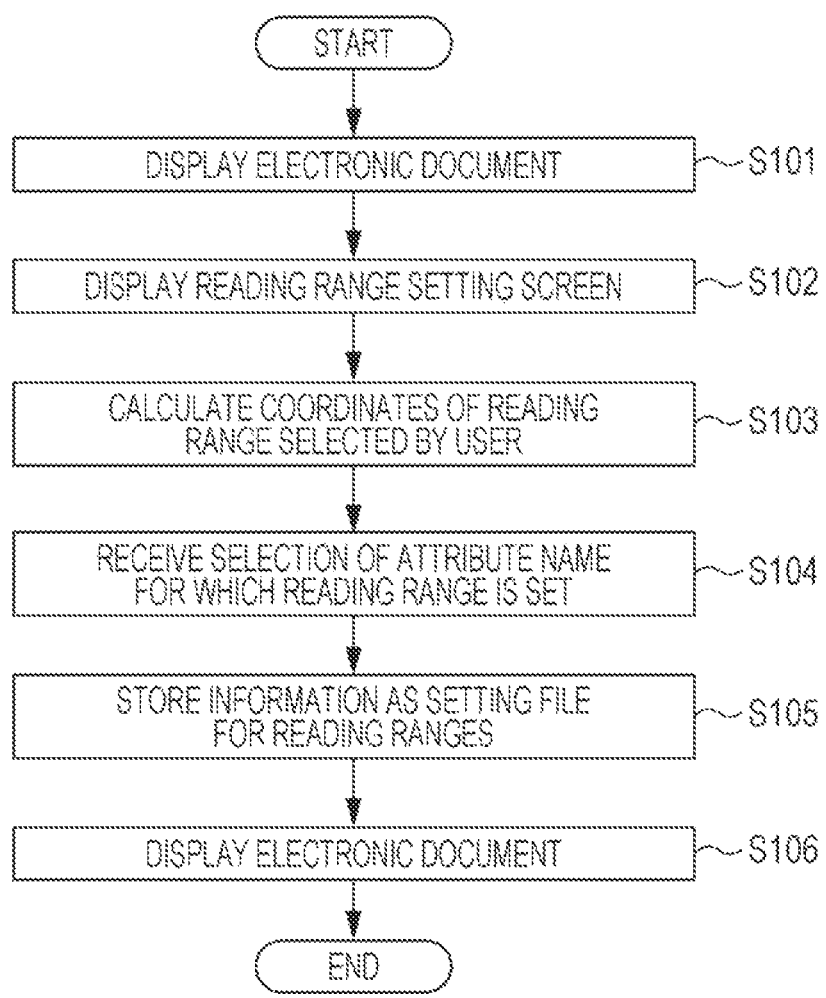
FIG. 4 is a flowchart for illustrating an operation for setting a reading range when OCR processing is performed in the document processing apparatus of the exemplary embodiment.

First, an operation to be performed when a reading range for the OCR processing (OCR reading range) is set by using an electronic document created based on a certain format is described with reference to a flowchart of FIG. 4.

Figure 5:
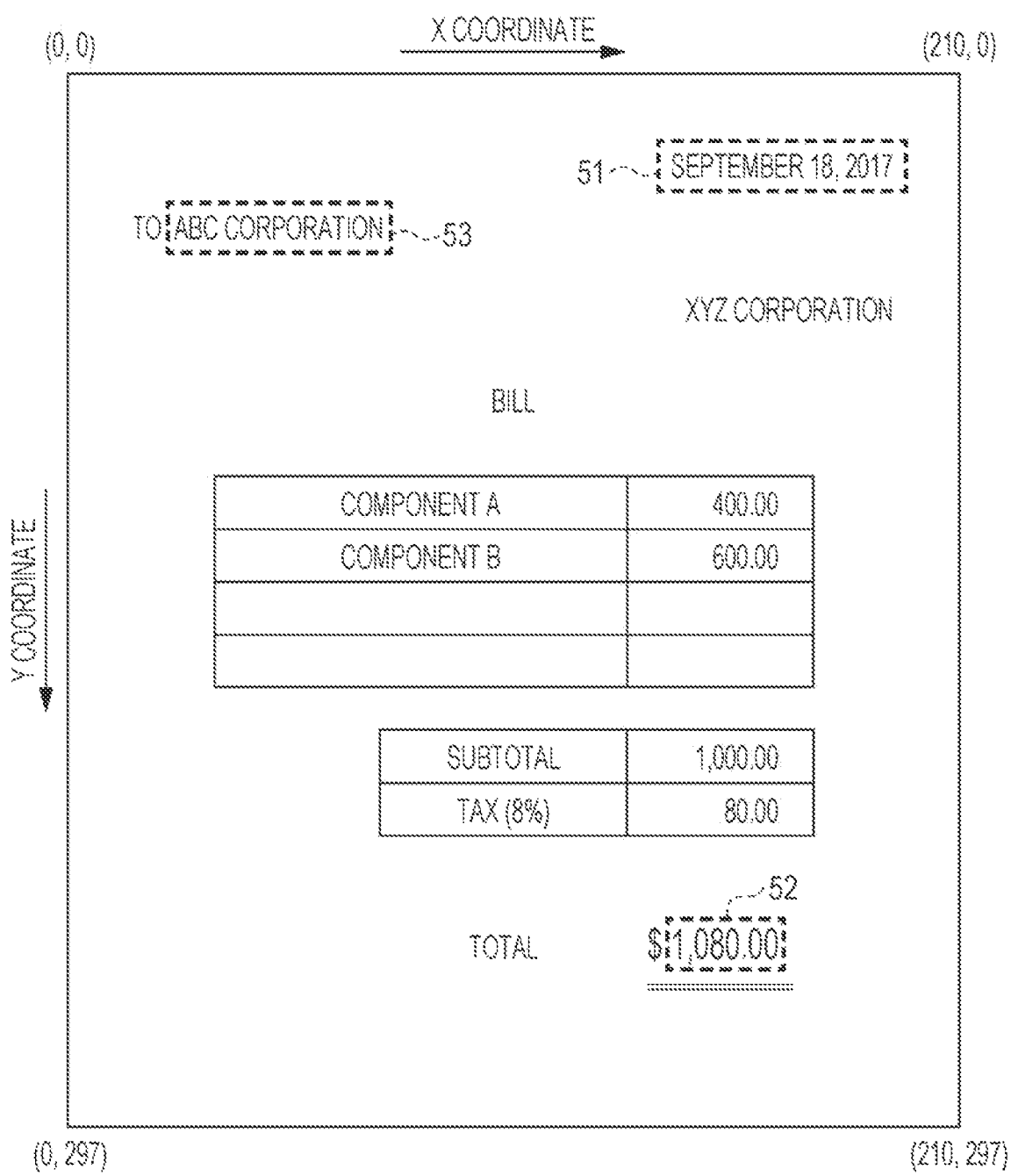
FIG. 5 illustrates an example of a format of "bill"

The following description is directed to a case in which attribute information is added to an electronic document of a bill created based on a format illustrated in FIG. 5.

The exemplary electronic document of the bill illustrated in FIG. 5 is an electronic document obtained by scanning a paper document of a letter size (216×279 mm). Date information is provided in an area 51. Amount (billed amount) information is provided in an area 52. Information on the name of a customer to be billed is provided in an area 53. The following description is directed to a case in which the areas 51 to 53 are set as the OCR reading ranges.

As the coordinate information to be used for setting the OCR reading range, there is used coordinate information represented by an X coordinate in a horizontal direction and a Y coordinate in a vertical direction with a reference point (0, 0) defined at the upper left end of the electronic document.

Figure 6:
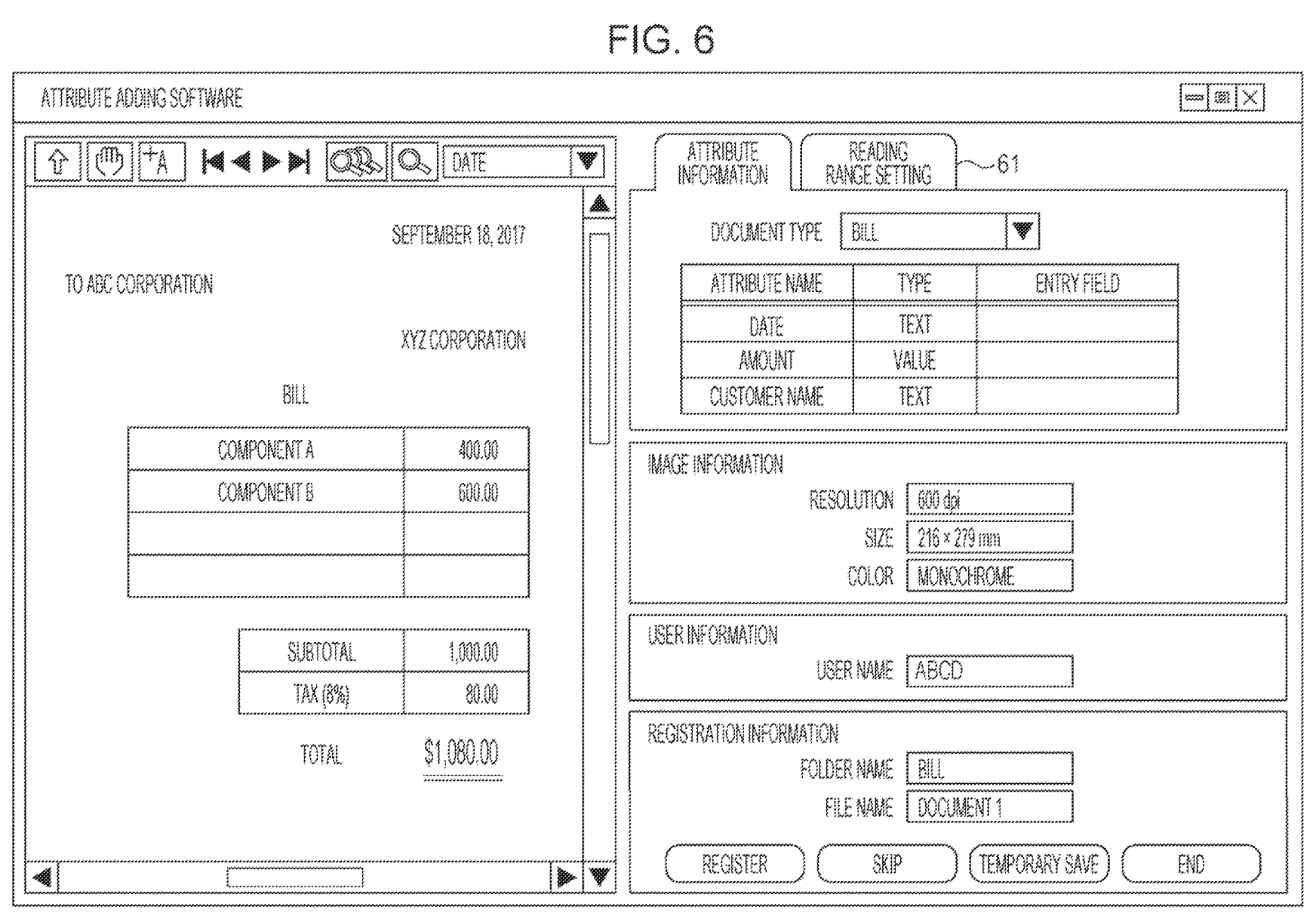

When the OCR reading range is set by using the electronic document described above, the control part 32 first causes the display part 33 to display the electronic document (Step S101). FIG. 6 illustrates an example of a display screen on which the electronic document is displayed by the attribute adding software.

In the example of the display screen illustrated in FIG. 6, a preview of the electronic document is displayed on the left and a registration screen for registering attribute information, a display screen for image information, and setting screens for user information and registration information are displayed on the right.

When the user selects a tab 61 in order to set the OCR reading range, a reading range setting screen is displayed as illustrated in FIG. 7 (Step S102).

The reading range setting screen illustrated in FIG. 7 is a screen on which OCR reading ranges for acquiring pieces of attribute information on types "date", "amount", and "customer name" are set in the electronic document whose document type is "bill".

Radio buttons to be used for selecting whether to perform reading simultaneously with the preview display are displayed on the reading range setting screen.

When a message "Read simultaneously with preview display" is selected, the OCR processing is executed in the set OCR reading range upon displaying the preview of the electronic document by the attribute adding software without waiting for a user's reading instruction. The obtained character information is automatically displayed in an entry field of each piece of attribute information.

When a message "Do not read simultaneously with preview display" is selected, the preview of the electronic document is displayed by the attribute adding software. In response to the user's reading instruction, the OCR processing is executed in the set OCR reading range and the obtained character information is displayed in the entry field of each piece of attribute information.

When the user selects the OCR reading range on the electronic document displayed as a preview by operating a mouse or the like in the reading range setting screen illustrated in FIG. 7, coordinates of the reading range selected by the user are calculated (Step S103).

Figure 8:
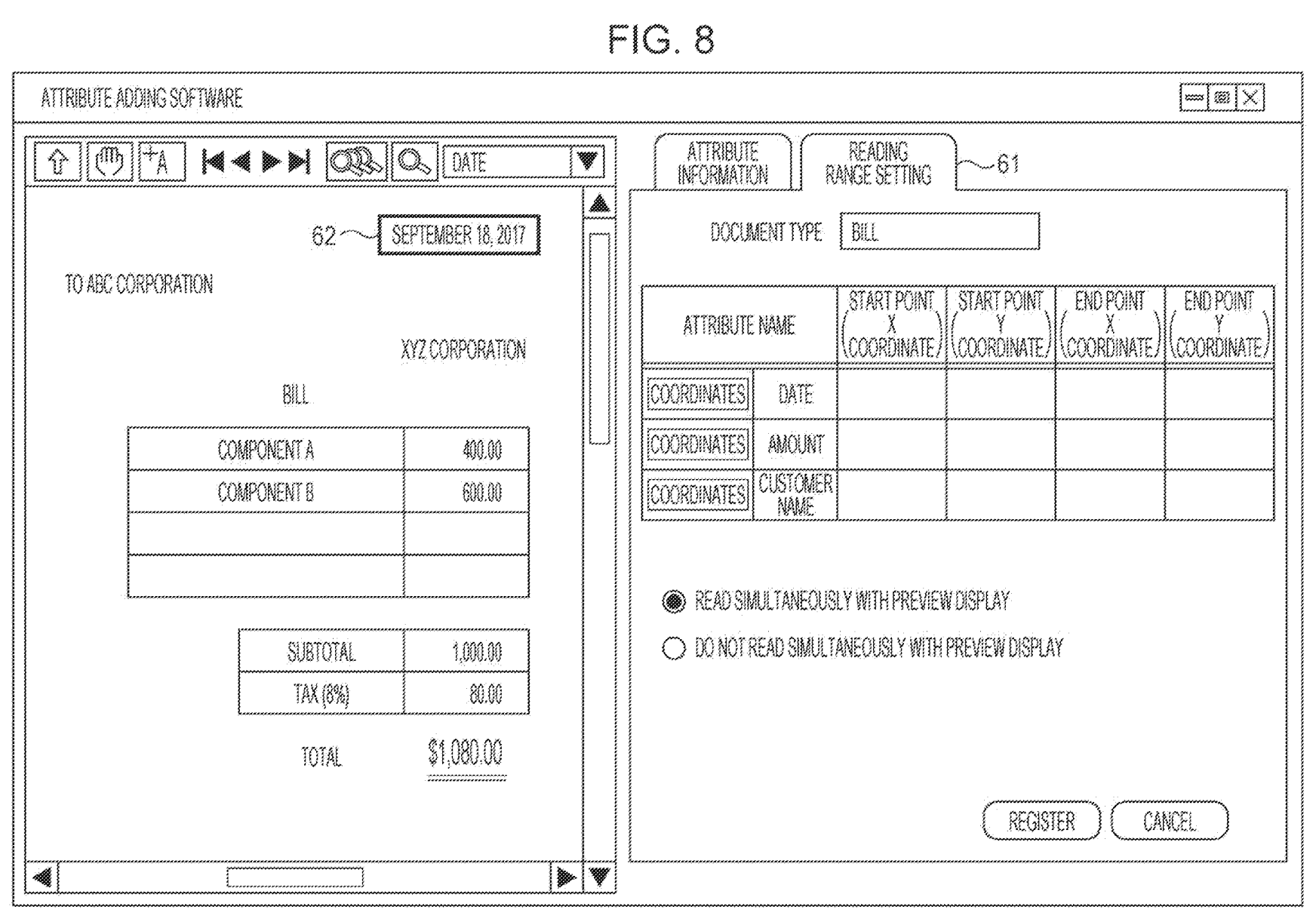

For example, FIG. 8 illustrates a case in which the user selects an area 62 of the preview that includes date information (Step S104).

Figure 9:
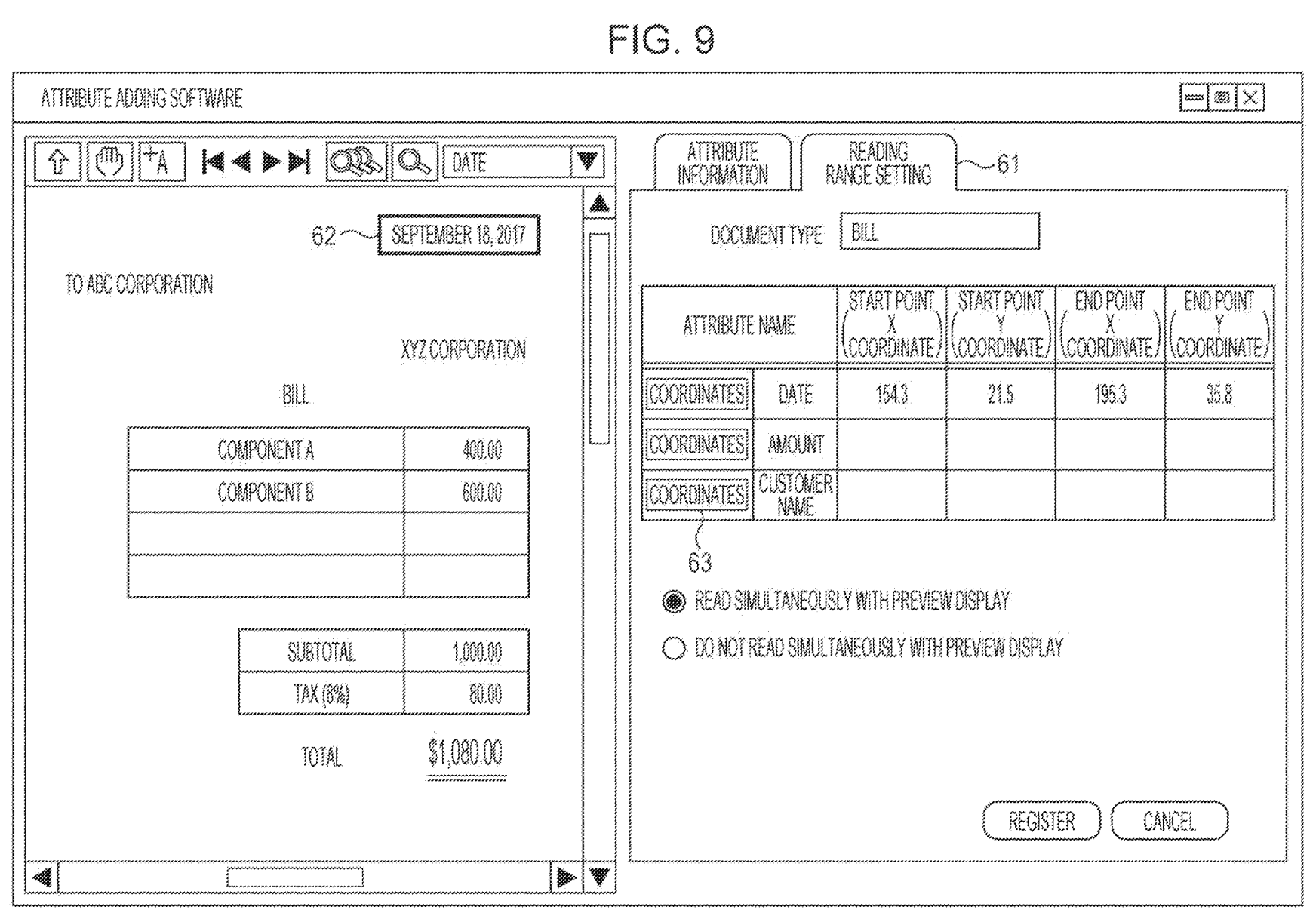

When the user operates a coordinate button 63 corresponding to a "date" field of attribute information while selecting the area 62 including the date information as illustrated in FIG. 9, coordinate information of the area 62 is set for the attribute information whose attribute name is "date". FIG. 9 illustrates a case in which X coordinates and Y coordinates of a start point and an end point of the area 62 are registered as the coordinate information.

FIG. 10 illustrates an example of a screen after the user has selected the OCR reading ranges of "date", "amount", and "customer name". The exemplary screen illustrated in FIG. 10 indicates a situation in which the areas 62, 65, and 64 are respectively selected as the OCR reading ranges of "date", "amount", and "customer name".

When the user finally depresses a "register" button, the control part 32 causes the data storage part 34 to store the pieces of coordinate information of the areas selected for the pieces of attribute information with the individual attribute names as a setting file for OCR reading ranges of the pieces of attribute information with those attribute names (Step S105).

When the setting file for OCR reading ranges is stored, the screen returns to the display screen of the preview of the electronic document as illustrated in FIG. 6 (Step S106).

The example described above is directed to the case of generating the setting file in which the X coordinates and the Y coordinates of the start point and the end point of the OCR reading range of each piece of attribute information are registered as the coordinate information. Coordinate information illustrated in FIG. 11 may be registered as the setting file. The setting file for reading ranges illustrated in FIG. 11 indicates a case in which information on the horizontal position and the vertical position of the start point of each OCR reading range and information on the width and the height of the reading range are registered as the coordinate information.

A setting file for reading ranges illustrated in FIG. 12 indicates a case in which not only coordinate information of each reading range but also characteristic information related to characteristics of character information to be acquired from the reading range is registered for each attribute name. Specifically, in the case of the attribute information whose attribute name is "date", "alphabets" or "numerals" are set as the character type. In the case of the attribute information whose attribute name is "amount", "numerals" are set as the character type. In the case of the attribute information whose attribute name is "customer name", "alphabets" are set as the character type.

When the OCR processing part 36 performs the character recognition processing by reading a character image from each OCR reading range to convert the character image into character codes, the recognition processing is performed by using the characteristic information. Thus, improvement of the recognition rate is expected.

Figure 13A:
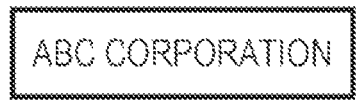
FIGS. 13A to 13C illustrate various patterns of character strings to be subjected to OCR reading.
Figure 13B:
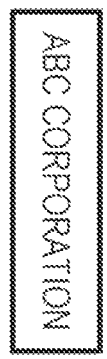
Figure 13C:
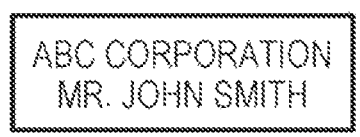

The character string to be subjected to the OCR reading may have various patterns. For example, the character string may be not only a simple horizontal character string as illustrated in FIG. 13A but also a vertical character string as illustrated in FIG. 13B or double-row character strings as illustrated in FIG. 13C.

Therefore, as illustrated in FIG. 14, not only the information on the character type but also information on a character direction and the number of character rows is set as the characteristic information related to the characteristics of the character information for each OCR reading range. Thus, the recognition rate of the recognition processing to be performed by the OCR processing part 36 may be improved compared with a case in which the characteristic information is not used.

By storing the setting file for reading ranges described above in association with a document type such as "bill" or "receipt", the OCR reading range corresponding to the document type of the electronic document may automatically be set when the electronic document is displayed by the attribute adding software.

Figure 15:
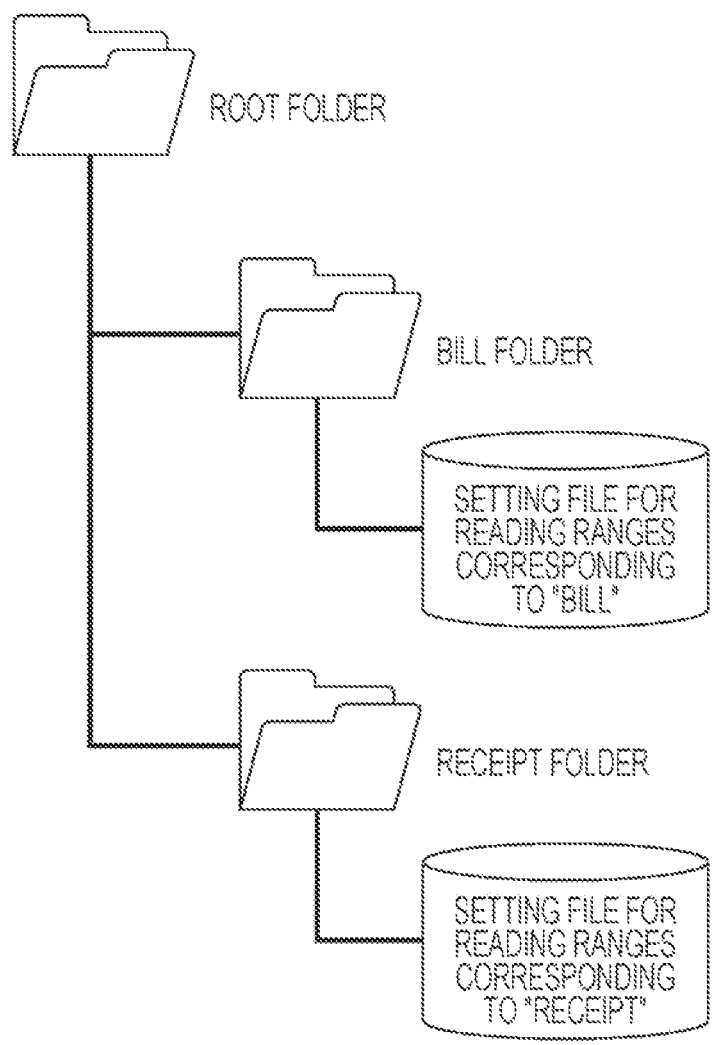
FIG. 15 illustrates a situation in which a setting file for reading ranges corresponding to a document type of each electronic document is stored in a folder categorized by the document type.

Even if the setting file for reading ranges is not stored in association with the document type, as illustrated in, for example, FIG. 15, the setting file for reading ranges corresponding to the document type of each electronic document may be stored in a folder categorized by the document type. When a certain electronic document is displayed by the attribute adding software, the OCR reading ranges may be set by using the setting file in the folder that stores the electronic document.

Figure 16:
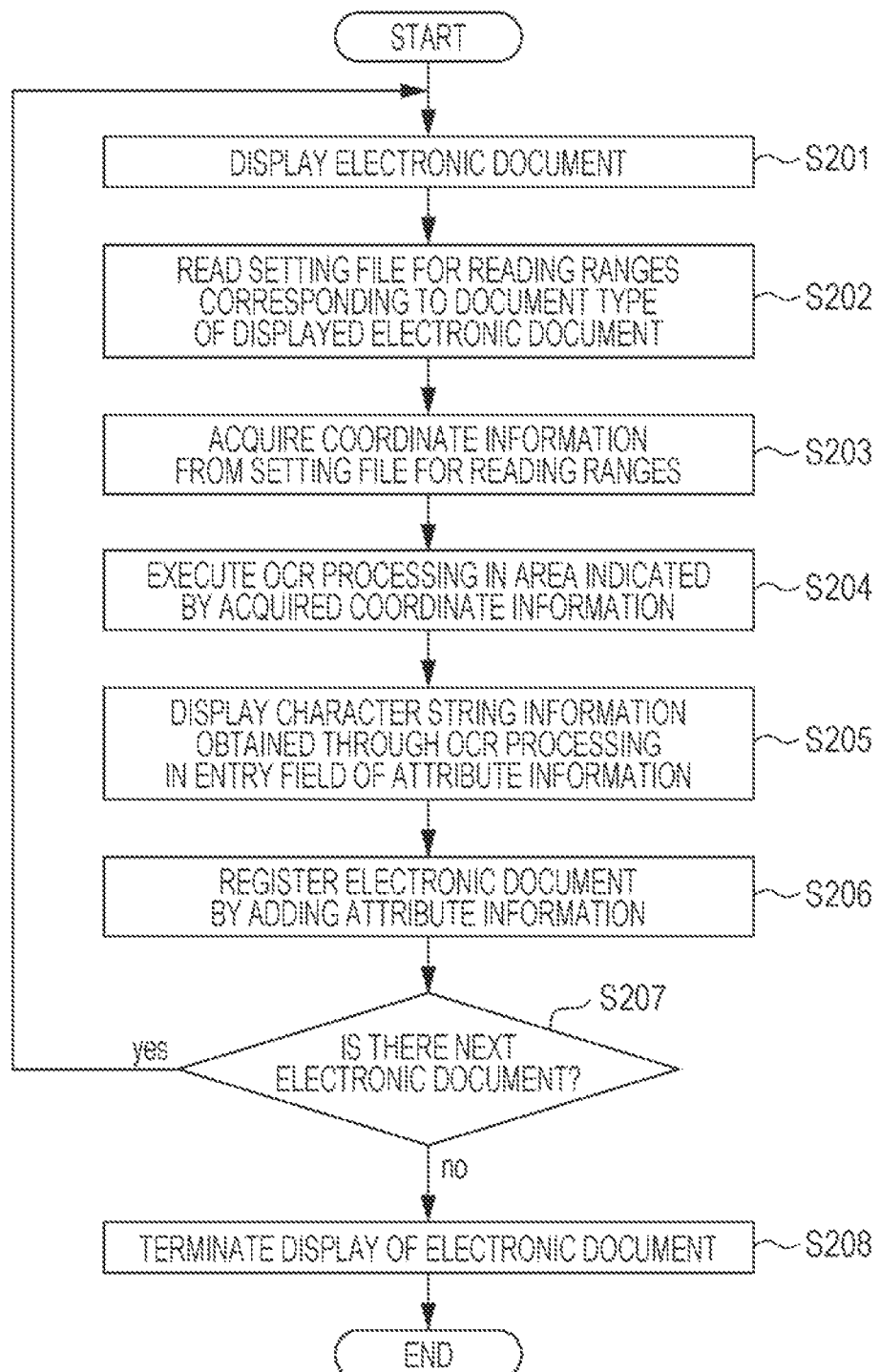
FIG. 16 is a flowchart for illustrating an operation to be performed when an electronic document is displayed by the attribute adding software after a setting file for reading ranges has been generated.

Next, an operation to be performed when an electronic document is displayed by the attribute adding software after a setting file for reading ranges has been generated as described above is described with reference to a flowchart of FIG. 16.

When an operation is performed so as to display, by the attribute adding software, an electronic document of a document type for which a setting file for reading ranges has been generated through the operation described above, a preview of the electronic document is displayed (Step S201).

The following description is made under the assumption that the setting is made such that the reading is performed simultaneously with the preview display. The setting file for reading ranges corresponding to the document type of the electronic document displayed as a preview is read (Step S202) and coordinate information of each OCR reading range is acquired from the setting file for reading ranges (Step S203). The OCR processing part 36 performs the character recognition processing on an image in each area indicated by the acquired coordinate information (Step S204) and the obtained character string information is automatically displayed in an entry field corresponding to an attribute name of each piece of attribute information (Step S205).

For example, FIG. 17 illustrates an example of a display screen when an electronic document of a certain bill is displayed by the attribute adding software. In the example of the display screen illustrated in FIG. 17, only by displaying a preview of the electronic document whose document type is set to "bill" by the attribute adding software, pieces of character information "Oct. 10, 2017", "$972.00", and "DEF Corporation" that are acquired through the OCR processing from preset OCR reading ranges of the preview image are respectively displayed in entry fields of "date", "amount", and "customer name" of pieces of attribute information.

When the user depresses a "register" button 66 in the state in which the acquired pieces of character information are displayed in the entry fields of the respective attribute names of the pieces of attribute information, the pieces of character information displayed in the entry fields are registered as the pieces of attribute information of the electronic document (Step S206).

When a next electronic document is present, the processing of Steps S201 to S206 is repeated ("yes" in Step S207). When the addition of attribute information to all the electronic documents is completed ("no" in Step S207), the display of the electronic document is terminated (Step S208).

When the OCR processing is properly performed in the preset OCR reading ranges, only by displaying the electronic document as illustrated in FIG. 17, the acquired pieces of character information are displayed in the entry fields of the respective attribute names of the pieces of attribute information. There is a case in which the OCR processing is not properly performed in the preset OCR reading ranges. Processing to be performed in this case is described with reference to FIG. 18A to FIG. 19.

When the reading processing is properly performed, the acquired character information is displayed in the entry field as illustrated in FIG. 18A. When a reading error has occurred because the OCR processing is not properly performed, as illustrated in FIG. 18B and FIG. 18C, information is not displayed in the entry field of the attribute name and the entry field is displayed in red in order to indicate the occurrence of the error or an indication that the reading error has occurred is displayed in the entry field.

Also in the preview of the electronic document, the set OCR reading range is displayed in a color indicating the occurrence of the error as typified by a red box. FIG. 18B illustrates a case in which the positions of the OCR reading range and the character image of the electronic document deviate from each other. FIG. 18C illustrates a case in which a character image to be subjected to the character recognition is not present in the OCR reading range.

When the reading error has occurred, as in an example of a display screen of FIG. 19, a notification may be given to the user by displaying, on the preview, an indication that the reading error has occurred. The exemplary display screen illustrated in FIG. 19 indicates a case in which the user is notified of the occurrence of the reading error by displaying a message "'Customer name' cannot be read properly!

Please set the reading range again!" on the preview while the message is superposed on the preview.

When the reading error has occurred, the user displays the reading range setting screen again and sets the coordinate information again to correct the OCR reading range.

The case in which an abnormality occurs in the reading processing includes not only the cases described above but also a case in which the character type of the character information read through the OCR processing is not identical to the character type set for the attribute information. Specifically, when the read character information is alphabets though the character type set for the attribute information is "numerals", the user is notified that an abnormality has occurred in the reading processing. When the read character information is Roman numerals though the character type set for the attribute information is "numerals", the read Roman numerals may be converted into Arabic numerals and displayed while attracting user's attention by changing the color of the entry field of the attribute information into yellow or the like.

Also when the coordinate information in the setting file for reading ranges falls out of a range of a paper size, the user is notified that the reading processing is not properly executable so as to prompt the user to set the reading range again.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document processing apparatus, comprising:
    a scanner configured to capture a document and create a scanned electronic document corresponding to the document;
    the document processing apparatus configured with a memory and processor, programmed to perform the following:
        store in the memory in advance a format of the scanned electronic document, the format of the scanned electronic document including for each of a plurality of character information data fields, comprising: (i) a character direction of the character information, and (ii) a number of character rows of the character information;
        acquire from the scanned electronic document, character information using at least the character direction and number of character rows from the format stored in memory in advance; and
        if the document processing apparatus is able to acquire the character information, register the acquired character information as attribute information of the electronic document, and
        if the document processing apparatus is not able to acquire the character information, alert a user that the attribute information is not registrable.

* * * * *